United States Patent
Tachibana

(10) Patent No.: US 11,880,187 B2
(45) Date of Patent: Jan. 23, 2024

(54) STEEL PLANT CONTROL DEVICE

(71) Applicant: Toshiba Mitsubishi-Electric Industrial Systems Corporation, Tokyo (JP)

(72) Inventor: Minoru Tachibana, Tokyo (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 518 days.

(21) Appl. No.: 16/978,190

(22) PCT Filed: Jun. 12, 2018

(86) PCT No.: PCT/JP2018/022458
§ 371 (c)(1),
(2) Date: Sep. 4, 2020

(87) PCT Pub. No.: WO2019/239494
PCT Pub. Date: Dec. 19, 2019

(65) Prior Publication Data
US 2021/0223759 A1    Jul. 22, 2021

(51) Int. Cl.
*G05B 19/414*    (2006.01)
(52) U.S. Cl.
CPC ............ *G05B 19/4147* (2013.01); *G05B 2219/41186* (2013.01); *G05B 2219/42034* (2013.01)
(58) Field of Classification Search
None
See application file for complete search history.

(56) References Cited

U.S. PATENT DOCUMENTS 6,415,215 B1 * 7/2002 Nishizaki .............. B62D 6/003
701/72

FOREIGN PATENT DOCUMENTS

JP    2007-134823 A    5/2007
JP    2011-138200 A    7/2011

OTHER PUBLICATIONS

Shu, Zhibing, and Caizhong Yan. "Design of High Quality Controller to be Advantage over PI with Low-Pass Controllers." 2006 IEEE Conference on Robotics, Automation and Mechatronics. IEEE, 2006. (Year: 2006).*
International Search Report and Written Opinion dated Sep. 11, 2018 for PCT/JP2018/022458 filed on Jun. 12, 2018, 6 pages including English Translation of the International Search Report.
Office Action dated Jul. 23, 2021, in corresponding Indian patent Application No. 202017053844, 4 pages.

* cited by examiner

*Primary Examiner* — Carlos R Ortiz Rodriguez
(74) *Attorney, Agent, or Firm* — XSENSUS LLP

(57) ABSTRACT

A steel plant control device includes a subtractor, a PI controller, a first-order lag controller, and an adder. In a band that is lower than a first frequency f1, a gain of the PI controller is higher than a gain of the first-order lag controller; in a band from the first frequency f1 to a second frequency f2, the gain of the first-order lag controller is higher than the gain of the PI controller; and in a band that is higher than the second frequency f2, the gain of the PI controller is higher than the gain of the first-order lag controller.

2 Claims, 5 Drawing Sheets

STEEL PLANT CONTROL DEVICE

CROSS-REFERENCE TO RELATED APPLICATION

The present application is based on PCT filing PCT/JP2018/022458, filed Jun. 12, 2018, the entire contents of which are incorporated herein by reference.

FIELD

The present invention relates to a steel plant control device.

BACKGROUND

A simplified control method that targets a process as a control object and is based on the simple adaptive control method has been proposed. This control method determines a variable gain only with the minimum required control deviation, thereby further simplifying its configuration. By the variable gain based on a square integral value of a value related to the control deviation, when a peak value of the control deviation is large, the state of a gain having a large value is maintained and active control is performed. As a result, the peak value of the control deviation is decreased and simultaneously, the gain is returned to its original small value, so that a steady state is stabilized.

CITATION LIST

Patent Literature

[PTL 1] JP 2011-138200 A

SUMMARY

Technical Problem

However, even after a control variable converges to a target value and a control deviation converges to zero, a load change and a characteristic change of a control object often occur. Against such a load change and characteristic change, it takes time for convergence with the variable gain which has been returned to its original small value.

As a countermeasure against this, according to JP 2011-138200 A, the time for returning a variable gain to its original small value is delayed by setting the time constant of a first-order lag element to a larger value by variable gain calculation means, so as to immediately respond to even a load change and a characteristic change of a control object that may occur after a control deviation converges to zero.

However, the above method causes the variable gain to be applied also to other parts which are not in a steady state and therefore, if adjustment is desired to be performed only for a load change and a characteristic change of a control object that may occur after a control deviation converges to zero, the adjustment is difficult.

The present invention has been made in order to solve the above-described problems, and it is an object of the present invention to provide a steel plant control device that can immediately respond to a load change and a characteristic change of a control object that may occur after a control deviation converges to zero, thereby allowing an excellent response characteristic to be realized.

Solution to Problem

In order to achieve the above object, a steel plant control device according to the present invention is configured as follows.

The steel plant control device according to the present invention includes a subtractor, a PI controller, a first-order lag controller, and an adder.

The subtractor outputs a deviation e (control deviation) between a target value r and a control variable y which is fed back from a control object.

The PI controller receives an input of the deviation e; and outputs a first manipulated variable u1 for reducing the deviation e by using a proportional action and an integral action.

The first-order lag controller is arranged in parallel with the PI controller. The first-order lag controller outputs a second manipulated variable u2 which is obtained by multiplying the deviation e by a proportional gain $K_{p2}$ and further multiplying by a first-order lag element LAG.

The adder outputs to the control object a final manipulated variable u which is obtained by adding the second manipulated variable u2 to the first manipulated variable u1.

Here, in a band that is lower than a first frequency, a gain of the PI controller is higher than a gain of the first-order lag controller; in a band from the first frequency to a second frequency that is higher than the first frequency, the gain of the first-order lag controller is higher than the gain of the PI controller; and in a band that is higher than the second frequency, the gain of the PI controller is higher than the gain of the first-order lag controller.

Advantageous Effects of Invention

In the steel plant control device according to the present embodiment, a gain in a band from the first frequency to the second frequency is increased and other bands are hardly affected. The band from the first frequency to the second frequency can be adjusted in the vicinity of a fluctuating frequency due to a load change or a characteristic change of the control object that may occur after the control deviation converges to zero. Therefore, it is possible to immediately respond to a load change or a characteristic change of the control object that may occur after the control deviation converges to zero, thereby allowing an excellent response characteristic to be realized.

DESCRIPTION OF EMBODIMENTS

Figure 1:
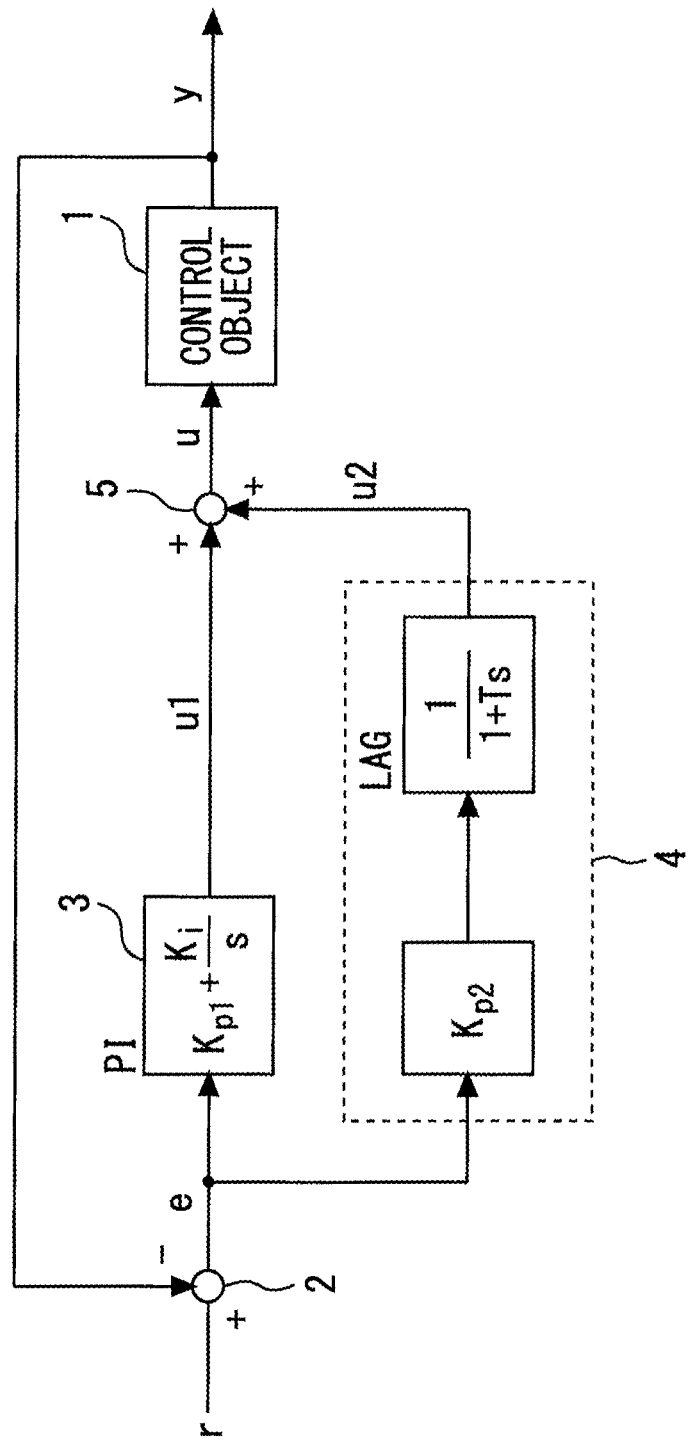
FIG. 1 is a control block diagram of a closed loop system according to a first embodiment.

Hereinafter, embodiments of the present invention will be described in detail with reference to drawings. It should be noted that common elements in the drawings are denoted by the same reference signs to omit redundant explanations.

First Embodiment

[Configuration of Closed Loop System]

FIG. 1 is a block diagram of a closed loop system according to a first embodiment. A control device of a closed loop system shown in FIG. 1 includes a subtractor 2 and a PI controller 3, and in addition, a first-order lag controller 4 and an adder 5.

In one example, a control object 1 is a finishing rolling mill that is provided on a hot rolling line and rolls a material to be rolled. The control object 1 receives an input of a final manipulated variable u and outputs a control variable y. The final manipulated variable u is a roll gap of a final stand of the finishing rolling mill. The control variable y is a strip thickness on a delivery side of the finishing rolling mill.

The subtractor 2 outputs a deviation e (control deviation) between a target value r and the control variable y which is fed back from the control object 1. The control variable y is detected by a sensor. The sensor is a strip thickness gauge which is arranged on the delivery side of the finishing rolling mill. The target value r is a target strip thickness on the delivery side of the finishing rolling mill.

The PI controller 3 (transfer function is $K_{p1}+K_i/s$) will be described. The PI control is a type of feedback control, and is a control method that combines a proportional action and an integral action. The proportional action is an action that changes the manipulated variable in proportion to the deviation e. The integration action is an action that changes the manipulated variable in proportion to the integration of the deviation e. The PI controller 3 receives an input of the deviation e; and outputs a first manipulated variable u1 for reducing the deviation e by using the proportional action and the integral action.

The first-order lag controller 4 is arranged in parallel with the PI controller 3. The first-order lag controller 4 receives an input of the deviation e; and outputs a second manipulated variable u2 which is obtained by multiplying the deviation e by a proportional gain $K_{p2}$ and further multiplying by a first-order lag element LAG (transfer function is $1/(1+T_s)$, where T is a time constant) which exists in the control object 1.

The adder 5 outputs to the control object 1 a final manipulated variable u which is obtained by adding an output of the first-order lag controller 4 (second manipulated variable u2) to an output of the PI controller 3 (first manipulated variable u1).

Figure 2:
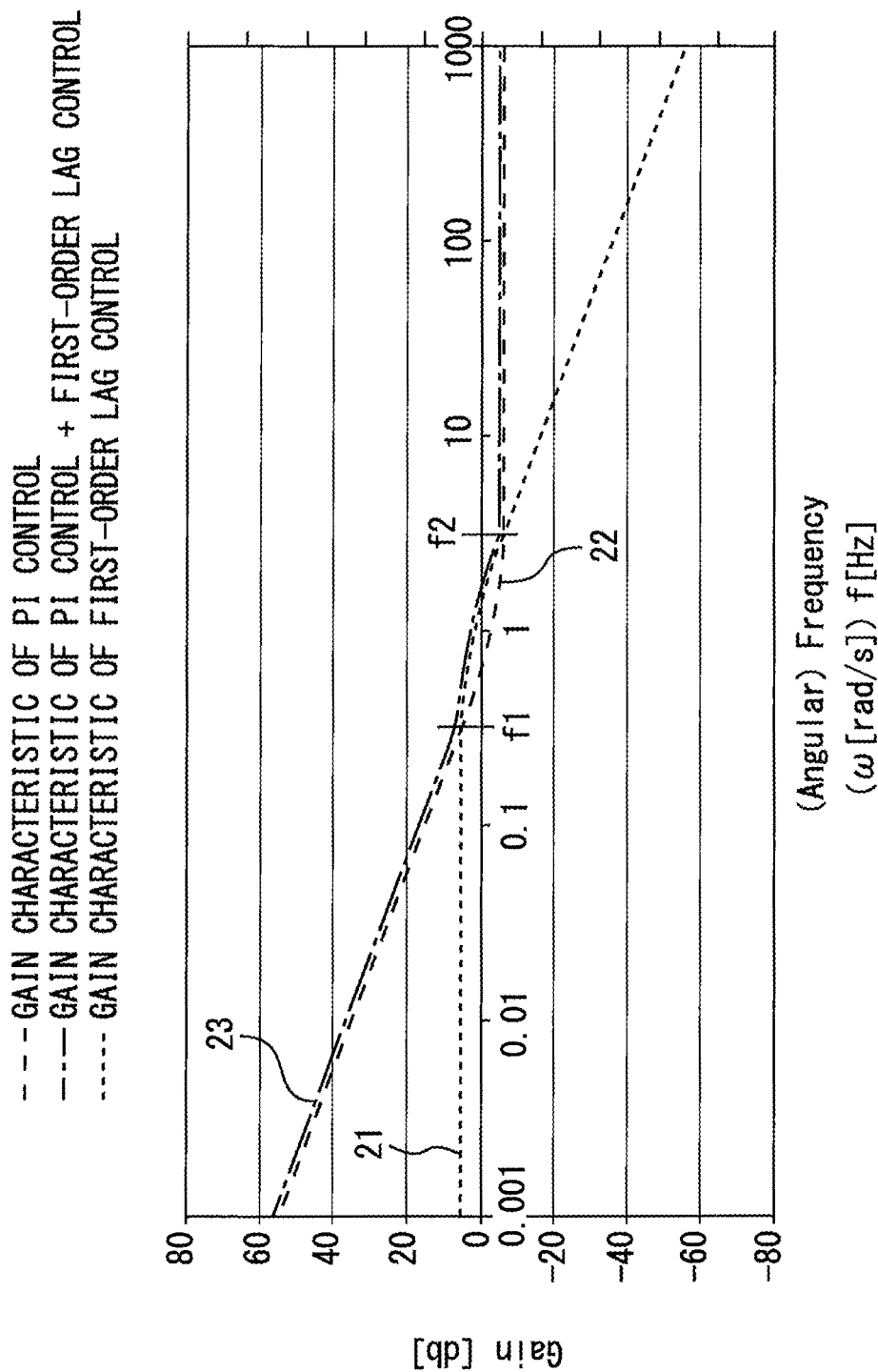
FIG. 2 is a Bode diagram that shows the frequency characteristics of a transfer function.

Features of the present embodiment will be described with reference to FIG. 2. FIG. 2 is a Bode diagram that shows the frequency characteristics of a transfer function. A horizontal axis is a logarithmic axis of an angular frequency ω [rad/s]. A vertical axis on a left side is a logarithmic axis of a gain [dB].

A gain curve 21 shows the gain characteristic of first-order lag control. A gain curve 22 shows the gain characteristic of PI control. A gain curve 23 shows a gain characteristic obtained by adding the PI control and the first-order lag control together.

In a steel plant control device according to the present embodiment, the $K_{p2}$ and time constant T of the first-order lag controller 4 are adjusted so that the frequency characteristic indicated by the gain curve 23 in FIG. 2 can be obtained. Specifically, as shown in the gain curve 21, the proportional gain $K_{p2}$ and the time constant T of the first-order lag controller 4 are adjusted so that the gain becomes 0 or more at the angular frequency ω=1 or less.

Therefore, as for the gain curve 23 obtained by adding the gain curve 21 and the gain curve 22 together, a gain of the PI controller 3 is higher than a gain of the first-order lag controller 4 in a band that is lower than a first frequency f1; the gain of the first-order lag controller 4 is higher than the gain of the PI controller 3 in a band from the first frequency f1 to a second frequency f2 that is higher than the first frequency f1; and the gain of the PI controller 3 is higher than the gain of the first-order lag controller 4 in a band that is higher than the second frequency f2.

In other words, the gain of the first-order lag controller 4 is dominant in the band from the first frequency f1 to the second frequency f2; and in the band lower than the first frequency f1 and the band higher than the second frequency f2, the gain of the PI controller 3 is dominant. The band from the first frequency f1 to the second frequency f2 corresponds to the vicinity of a fluctuating frequency due to a load change or a characteristic change of the control object that may occur after the deviation e converges to zero. Therefore, according to the present embodiment, as indicated by the gain curve 23, only the gain in the vicinity of the fluctuating frequency is increased, and the other frequency bands are hardly affected.

Thus, by adding the first-order lag controller 4 in parallel to the PI controller 3 to increase the gain only for the vicinity of a control response, tracking to the target value becomes quick. As a result, it is possible to immediately respond to a load change or a characteristic change of the control object that may occur after the control deviation converges to zero, thereby allowing an excellent response characteristic to be realized. It should be noted that in the case of hot rolling, "a load change or a characteristic change of the control object" includes the expansion of a machine due to the temperature or heat of a strip, roll eccentricity, and the like.

Figure 3:
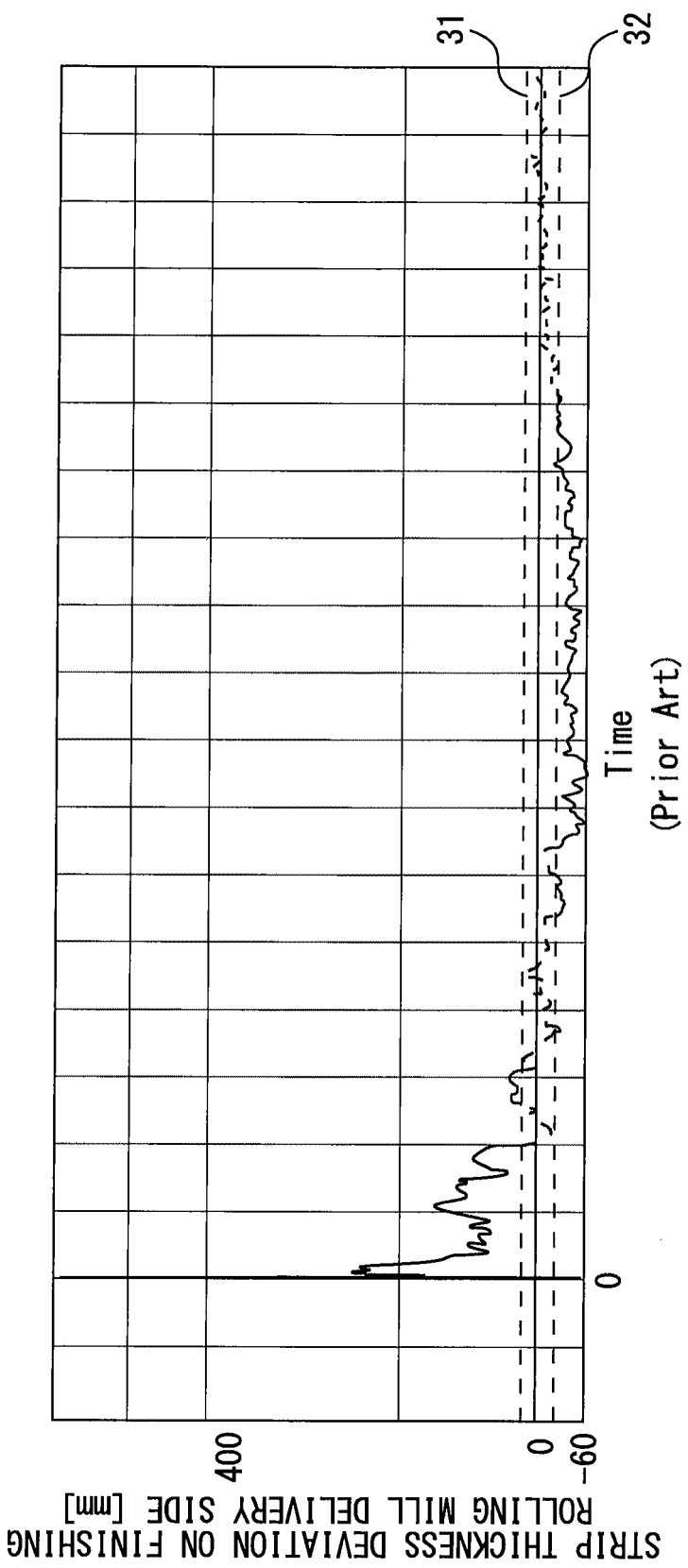
FIG. 3 is a chart that shows the fluctuation of a strip thickness deviation on a delivery side of a finishing rolling mill in a case where a first-order lag controller is not provided (only a PI controller).
Figure 4:
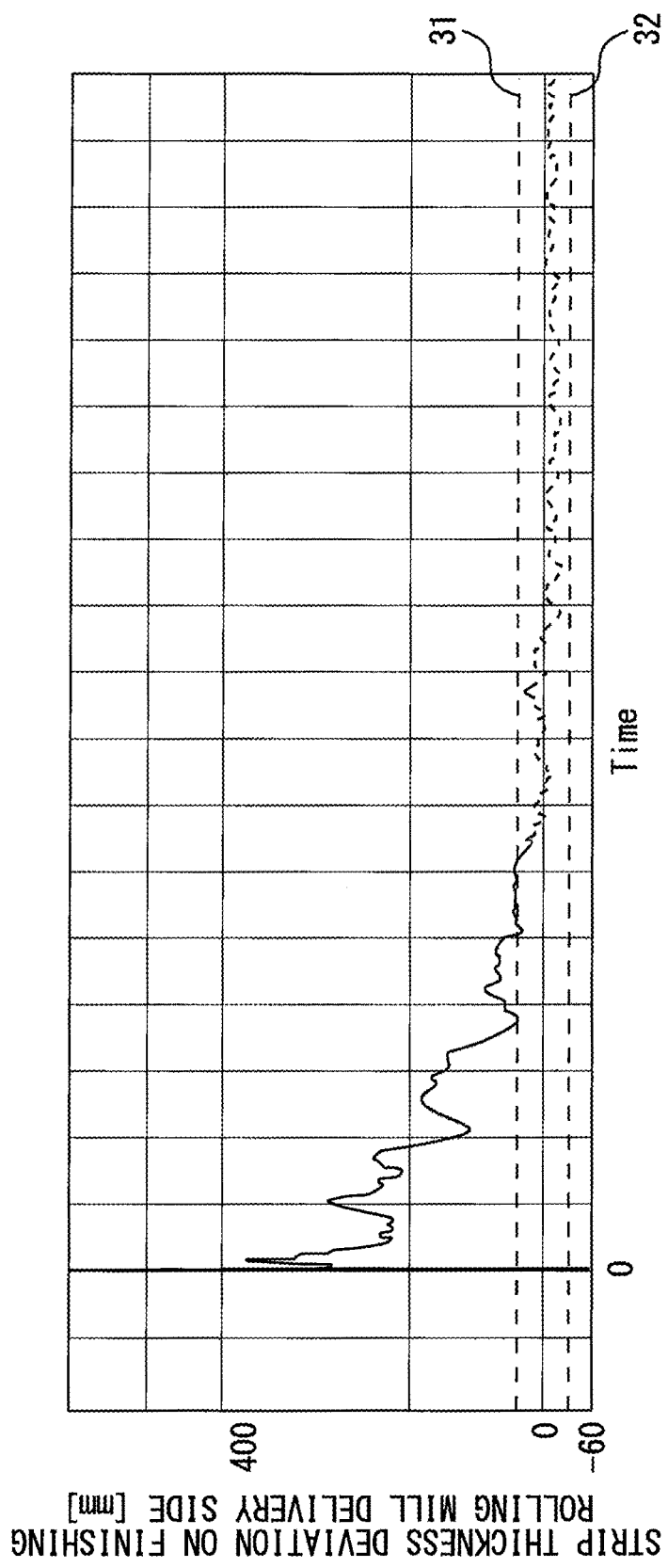
FIG. 4 is a chart that shows the fluctuation of a strip thickness deviation on the delivery side of the finishing rolling mill in a case where the first-order lag controller has been added in parallel to the PI controller.

Next, referring to FIG. 3 and FIG. 4, the fluctuation of the deviation e in the case of only the PI control and the fluctuation of the deviation e in the case of having added the first-order lag control to the PI control will be compared. FIG. 3 is a chart that shows the fluctuation of a strip thickness deviation e on the delivery side of the finishing rolling mill in a case where the first-order lag controller 4 is not provided (only the PI controller 3). FIG. 4 is a chart that shows the fluctuation of the strip thickness deviation e on the delivery side of the finishing rolling mill in a case where the first-order lag controller 4 has been added in parallel to the PI controller 3.

In the chart of FIG. 3, after a head end of the material to be rolled reaches the delivery side of the finishing rolling mill at time 0, the strip thickness deviation e temporarily converges to within an allowable range (between an upper limit value 31 and an lower limit value 32) (zero convergence) by the PI control. However, it cannot respond to a load change or a characteristic change of the control object after the zero convergence, and deviates from the allowable range.

On the other hand, in the chart of FIG. 4 in which the proportional gain $K_{p2}$ and the first-order lag element LAG are added to the PI control, after the head end of the material to be rolled reaches the delivery side of the finishing rolling mill at time 0, the strip thickness deviation e converges to within a target range (between the upper limit value 31 and the lower limit value 32) mainly by the PI control. As with the gain curve 23 in FIG. 2 described above, the proportional gain $K_{p2}$ and the time constant T are adjusted so that the gain between the first frequency and the second frequency is increased. Therefore, even when there is a load change or a characteristic change of the control object after the deviation e converges to zero, the convergence to the target value is quick and the deviation e can be stabilized within the target range.

It should be noted that the steel plant control device according to the present embodiment performs control outside the band from the first frequency f1 to the second frequency for large changes other than the load change or the characteristic change of the control object after zero convergence, in which convergence is achieved mainly by the PI control.

(Modification)

Figure 5:
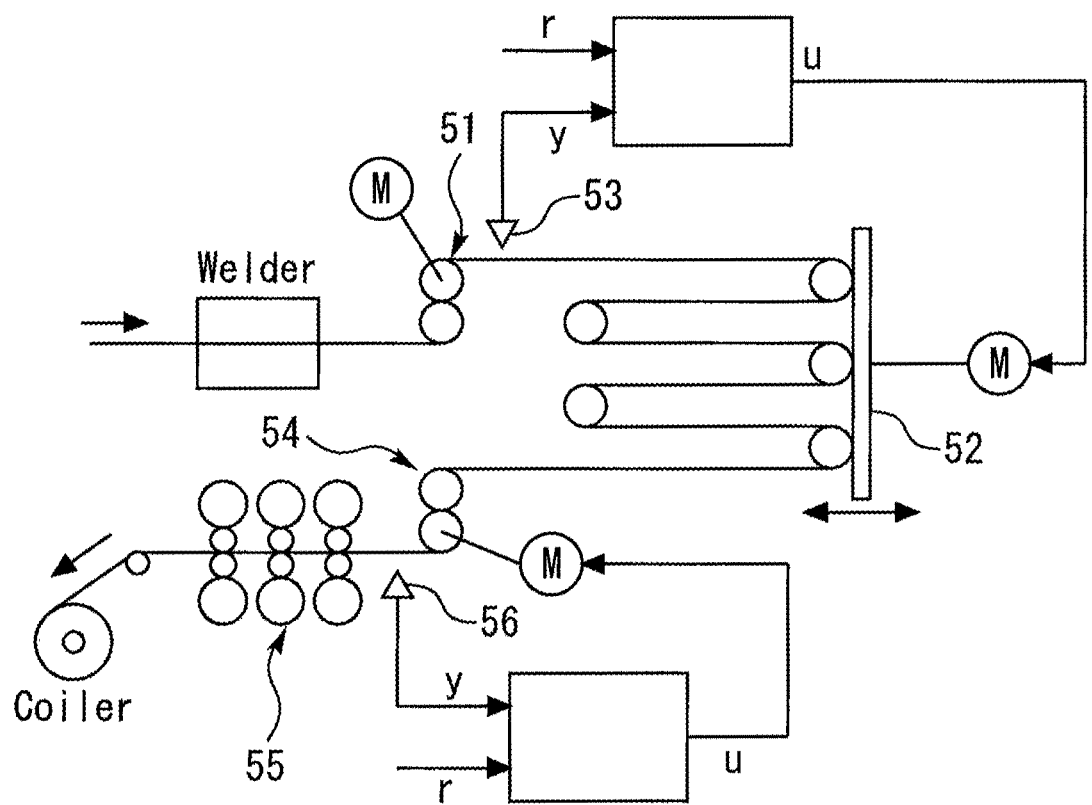
FIG. 5 is a diagram that shows a system configuration around a looper on a cold rolling line.

Incidentally, as for the above system of the first embodiment, description has been made by using strip thickness control on the delivery side of the finishing rolling mill on the hot rolling line; however, an application object of the present invention is not limited. For example, it can also be applied to tension control on a cold rolling line. FIG. 5 is a diagram that shows a system configuration around a looper on a cold rolling line.

In one application example, the steel plant control device can also be applied to ones that use as a feedback signal a control variable y which is detected by a tension meter 53 between a bridle roll 51 and a loop car 52 downstream thereof, and output a final manipulated variable u of the loop car 52 so that a deviation between the control variable y and a target value r converges to 0.

In another application example, the steel plant control device can also be applied to ones that use as a feedback signal a control variable y which is detected by a tension meter 56 between a bridle roll 54 downstream of the loop car 52 and a continuous rolling mill 55 downstream thereof, and output a final manipulated variable u of the bridle roll 54 so that a deviation between the control variable y and a target value r converges to 0.

The embodiments according to the present invention have been described above; however, the present invention is not limited to the above embodiments and various modifications can be made without departing from the scope of the present invention.

REFERENCE SIGNS LIST

1 Control object
2 Subtractor
3 PI controller
4 First-order lag controller
5 Adder
31 Upper limit value
32 Lower limit value
51, 54 Bridle roll
52 Loop car
53, 56 Tension meter
55 Continuous rolling mill
f1 First frequency
f2 Second frequency
$K_{p2}$ Proportional gain
LAG First-order lag element
r Target value
T Time constant
u Final manipulated variable
u1 First manipulated variable
u2 Second manipulated variable
y Control variable
ω Angular frequency

The invention claimed is:

1. A steel plant control device, comprising:
a subtractor that outputs a deviation between a target value and a control variable, the control variable being fed back from a control object;
a PI controller that receives an input of the deviation and outputs a first manipulated variable for reducing the deviation by using a proportional action and an integral action;
a first-order lag controller that outputs a second manipulated variable, the second manipulated variable being obtained by multiplying the deviation by a proportional gain and further multiplying by a first-order lag element; and
an adder that outputs to the control object a final manipulated variable, the final manipulated variable being obtained by adding the second manipulated variable to the first manipulated variable;
wherein, in a band that is lower than a first frequency, a gain of the PI controller is higher than a gain of the first-order lag controller; in a band from the first frequency to a second frequency that is higher than the first frequency, the gain of the first-order lag controller is higher than the gain of the PI controller; and in a band that is higher than the second frequency, the gain of the PI controller is higher than the gain of the first-order lag controller, and
wherein the band from the first frequency to the second frequency is a band that causes load change and characteristic change of the control object after the deviation converges to zero.

2. A steel plant control device, comprising:
means for subtracting that outputs a deviation between a target value and a control variable, the control variable being fed back from a control object;
PI control means for receiving an input of the deviation and outputting a first manipulated variable for reducing the deviation by using a proportional action and an integral action;
first-order lag control means for outputting a second manipulated variable, the second manipulated variable being obtained by multiplying the deviation by a proportional gain and further multiplying by a first-order lag element; and
means for adding that outputs to the control object a final manipulated variable, the final manipulated variable being obtained by adding the second manipulated variable to the first manipulated variable;
wherein, in a band that is lower than a first frequency, a gain of the PI control means is higher than a gain of the first-order lag control means; in a band from the first frequency to a second frequency that is higher than the first frequency, the gain of the first-order lag control means is higher than the gain of the PI control means; and in a band that is higher than the second frequency, the gain of the PI control means is higher than the gain of the first-order lag control means, and
wherein the band from the first frequency to the second frequency is a band that causes load change and characteristic change of the control object after the deviation converges to zero.

* * * * *